(12) United States Patent
Ichio

(10) Patent No.: US 8,573,998 B2
(45) Date of Patent: Nov. 5, 2013

(54) CHARGING CONNECTOR

(75) Inventor: Toshifumi Ichio, Yokkaichi (JP)

(73) Assignee: Sumitomo Wiring Systems, Ltd. (JP)

( * ) Notice: Subject to any disclaimer, the term of this patent is extended or adjusted under 35 U.S.C. 154(b) by 82 days.

(21) Appl. No.: 13/153,494

(22) Filed: Jun. 6, 2011

(65) Prior Publication Data

US 2011/0318950 A1 Dec. 29, 2011

(30) Foreign Application Priority Data

Jun. 28, 2010 (JP) .................................. 2010-146479

(51) Int. Cl.
*H01R 13/627* (2006.01)

(52) U.S. Cl.
USPC .......................................... 439/358; 439/372

(58) Field of Classification Search
USPC .............................. 439/358, 357, 310, 372, 34
See application file for complete search history.

(56) References Cited

U.S. PATENT DOCUMENTS

| | | | |
|---|---|---|---|
| 5,458,496 A | 10/1995 | Itou et al. | |
| 5,639,256 A * | 6/1997 | Endo et al. | 439/358 |
| 5,820,395 A * | 10/1998 | Hashizawa | 439/271 |
| 5,984,706 A * | 11/1999 | Kakuta et al. | 439/310 |
| 6,123,569 A | 9/2000 | Fukushima et al. | |
| 6,602,090 B2 | 8/2003 | Kato | |
| 6,953,361 B2 * | 10/2005 | Li et al. | 439/358 |
| 8,016,604 B2 | 9/2011 | Matsumoto et al. | |
| 8,152,550 B2 | 4/2012 | Ichio et al. | |
| 2011/0034053 A1 | 2/2011 | Matsumoto et al. | |
| 2011/0212645 A1 | 9/2011 | Osawa et al. | |
| 2011/0300733 A1 | 12/2011 | Janarthanam et al. | |

FOREIGN PATENT DOCUMENTS

| | | |
|---|---|---|
| EP | 2 500 987 | 9/2012 |
| JP | 2010-123521 | 6/2010 |
| JP | 2010-182461 | 8/2010 |
| WO | 2010060370 | 6/2010 |

OTHER PUBLICATIONS

Original Application; Original IDS; Second IDS; Corrected Second IDS; and Notice of Allowance.
Communication of Jun. 28, 2013.

* cited by examiner

*Primary Examiner* — Hien Vu
(74) *Attorney, Agent, or Firm* — Gerald E. Hespos; Michael J. Porco; Matthew T. Hespos

(57) ABSTRACT

A charging connector (10) is provided to be connected to a vehicle-side connector (50) for charging a battery in a vehicle. The charging connector (10) has a main body (11) including a connector fitting (13) connectable to the vehicle-side connector, a lock (22) for holding the vehicle-side connector (50) and the connector fitting portion (13) in a connected state by being locked to a lock projection (52) on the vehicle-side connector (50), an unlocking portion (23) for canceling the locked state of the lock (22) and the lock projection (52), and an unlocking hole 16 formed in the connector main body (11) at a position corresponding to the unlocking portion (23). The unlocking portion (23) projects to the outside of the main body (11) through the unlocking hole (16) and includes recesses (27) at positions facing the peripheral edge of the unlocking hole (16).

8 Claims, 17 Drawing Sheets

CHARGING CONNECTOR

BACKGROUND OF THE INVENTION

1. Field of the Invention

The invention relates to a charging connector to be connected to a vehicle-side connector for charging a battery in a vehicle.

2. Description of the Related Art

Japanese Unexamined Patent Publication No. 2010-123521 discloses a charging connector to be connected to a vehicle-side connector for charging a battery in a vehicle. The charging connector includes a case body with an open front end and a connector fitting at the open front end of the case body for connection to the vehicle-side connector. A lever is accommodated in the case body and extends in forward and backward directions. A lock is provided on a front end of a lever shaft, and an unlocking portion is provided on a rear end. The unlocking portion projects out from the case body through an unlocking hole in the case body.

The lock of the charging connector engages a lock-receiving portion on the vehicle-side connector to hold the two connectors in a connected state during charging. The unlocking portion is pushed to cancel the locked state of the lock and the lock-receiving portion after charging is completed so that the charging connector can be separated from the vehicle-side connector.

The charging connector typically is used outdoors and water is likely to enter a tiny clearance formed between the peripheral edge of the unlocking hole and a side surface of the unlocking portion. The water stays in the clearance due to the action of surface tension. If the water in the clearance freezes, water drops deposit on the frozen ice and further freeze. Ice accumulates by repeated freezing in this way. Thus, the lever and the case body become frozen firmly to interfere with an unlocking operation. The ice needs to be crushed or melted for removal and such crushing or melting is not easy.

The invention was developed in view of the above situation and an object thereof is to avoid interference with an unlocking operation caused by freezing.

SUMMARY OF THE INVENTION

The invention relates to a charging connector that is to be connected to a vehicle-side connector that is connected to a battery in a vehicle so that the battery in the vehicle can be charged. The charging connector includes a case body with a connector fitting that is connectable to the vehicle-side connector. The charging connector also has a lock and an unlocking portion. The lock can be locked to a lock-receiving portion on the vehicle-side connector for holding the vehicle-side connector and the charging connector in a connected state. The unlocking portion is capable of canceling the locked state of the lock and the lock-receiving portion. An unlocking hole is formed in the case body at a position substantially corresponding to the unlocking portion. The unlocking portion projects to the outside of the case body through the unlocking hole and includes at least one recess at a position substantially facing the peripheral edge of the unlocking hole.

A distance from the recess to the peripheral edge of the unlocking hole is longer as compared with the case where no recess is provided. Thus, even if water enters the recess, the action of surface tension is unlikely and water runs more easily down through the recess. Therefore, water does not stay in the recess and interference with an unlocking operation caused by freezing can be avoided.

A guide may be provided at a peripheral edge of the unlocking hole and may be connected to a side surface of the unlocking portion via an inclined surface.

The guide may have a surface processing with high water wettability. Thus, water runs more easily runs from the side surface of the unlocking portion to the guide via the inclined surface and/or due to the surface processing. Thus, entry of water between the side surface of the unlocking portion and the peripheral edge of the unlocking hole can be avoided even at a part of the unlocking portion where the recess is not formed.

A lever shaft may be accommodated in the case body and may have an upper surface. The unlocking portion may project from the upper surface. A downwardly sloped water drain may be provided at least partly around the unlocking portion on the upper surface of the lever shaft. Thus, any water that falls onto the upper surface of the lever shaft via the recess can be drained down from the lever shaft by the water drain.

A liquid guide may be provided on a surface of the lever shaft at least at a side of the locking portion.

The water guide may comprise one or more downwardly sloped taper surfaces that extend obliquely down from a tip of the water guide.

A distal edge of the recess may be a stepped surface.

The unlocking portion may include a pressing surface substantially extending obliquely down and/or substantially parallel to a part of the case body. Two side surfaces may extend down or in from the pressing surface at the substantially opposite widthwise sides of the unlocking portion and a rear surface may extend down or in at or near the rear end of the unlocking portion.

A distance between a front surface of the unlocking portion and a peripheral edge of the unlocking hole may be so set that the action of surface tension is unlikely.

A distal edge of the recess and the peripheral edge of the unlocking hole may act as shear blades so that any ice that forms in the recess can be crushed easily by the distal edge of the recess.

One or more water drain holes may be formed in at least one lower surface of the case body.

These and other objects, features and advantages of the present invention will become more apparent upon reading of the following detailed description of preferred embodiments and accompanying drawings. It should be understood that even though embodiments are separately described, single features thereof may be combined to additional embodiments.

DETAILED DESCRIPTION OF THE PREFERRED EMBODIMENTS

Figure 1:
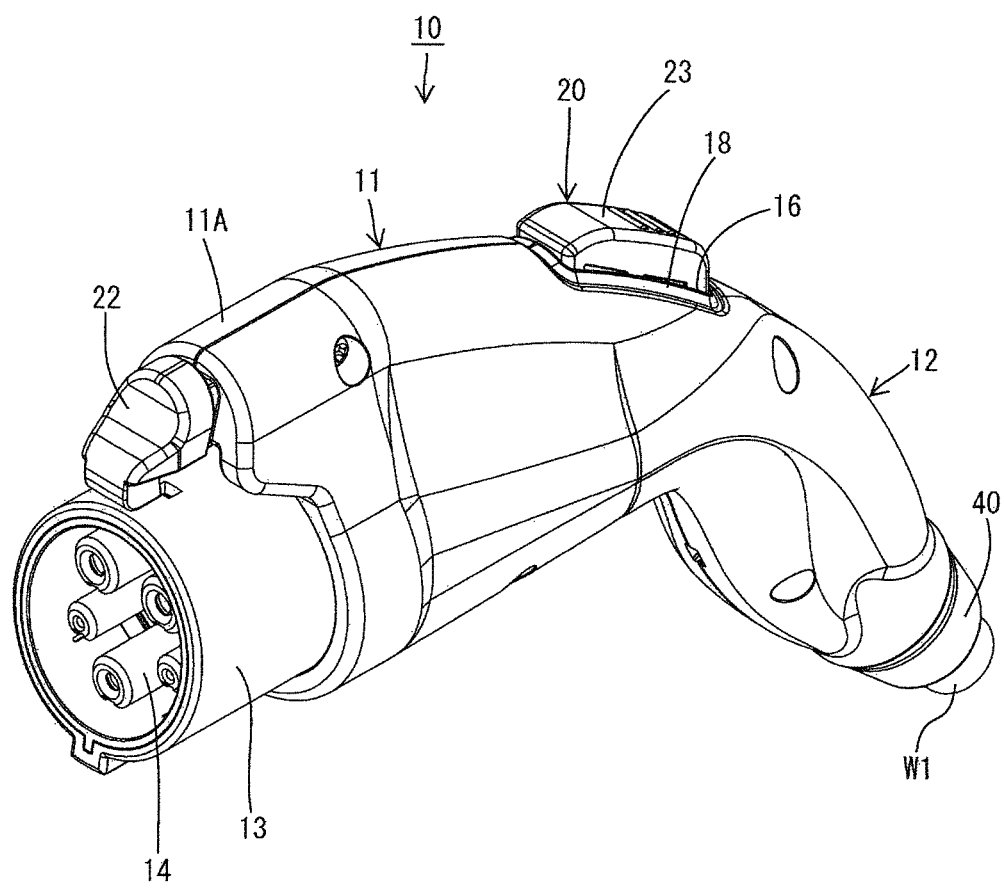
FIG. 1 is a perspective view of a charging connector according to an embodiment when obliquely viewed from front.
Figure 4:
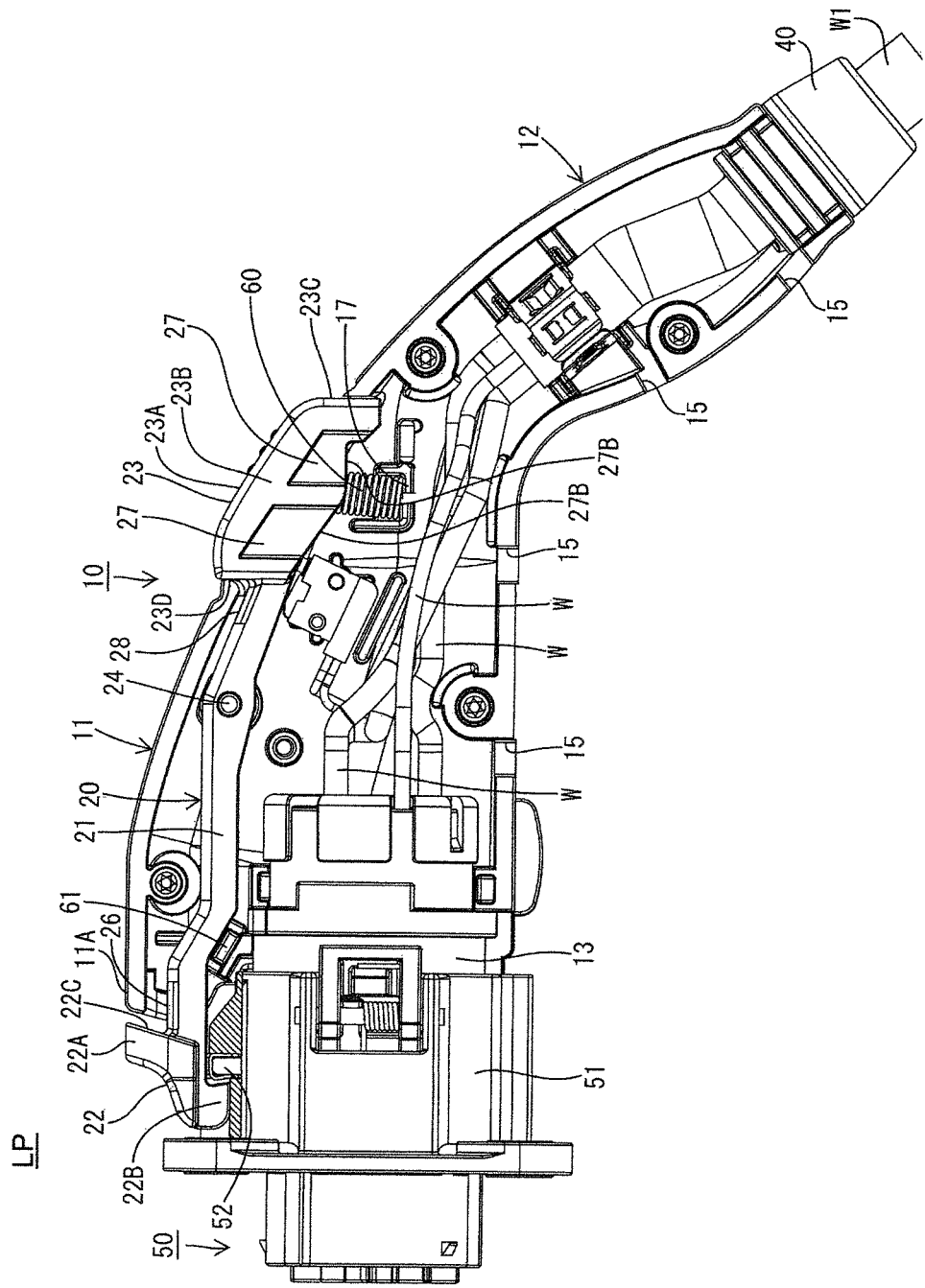
FIG. 4 is a view showing the internal structure of a case body in FIG. 2.
Figure 5:
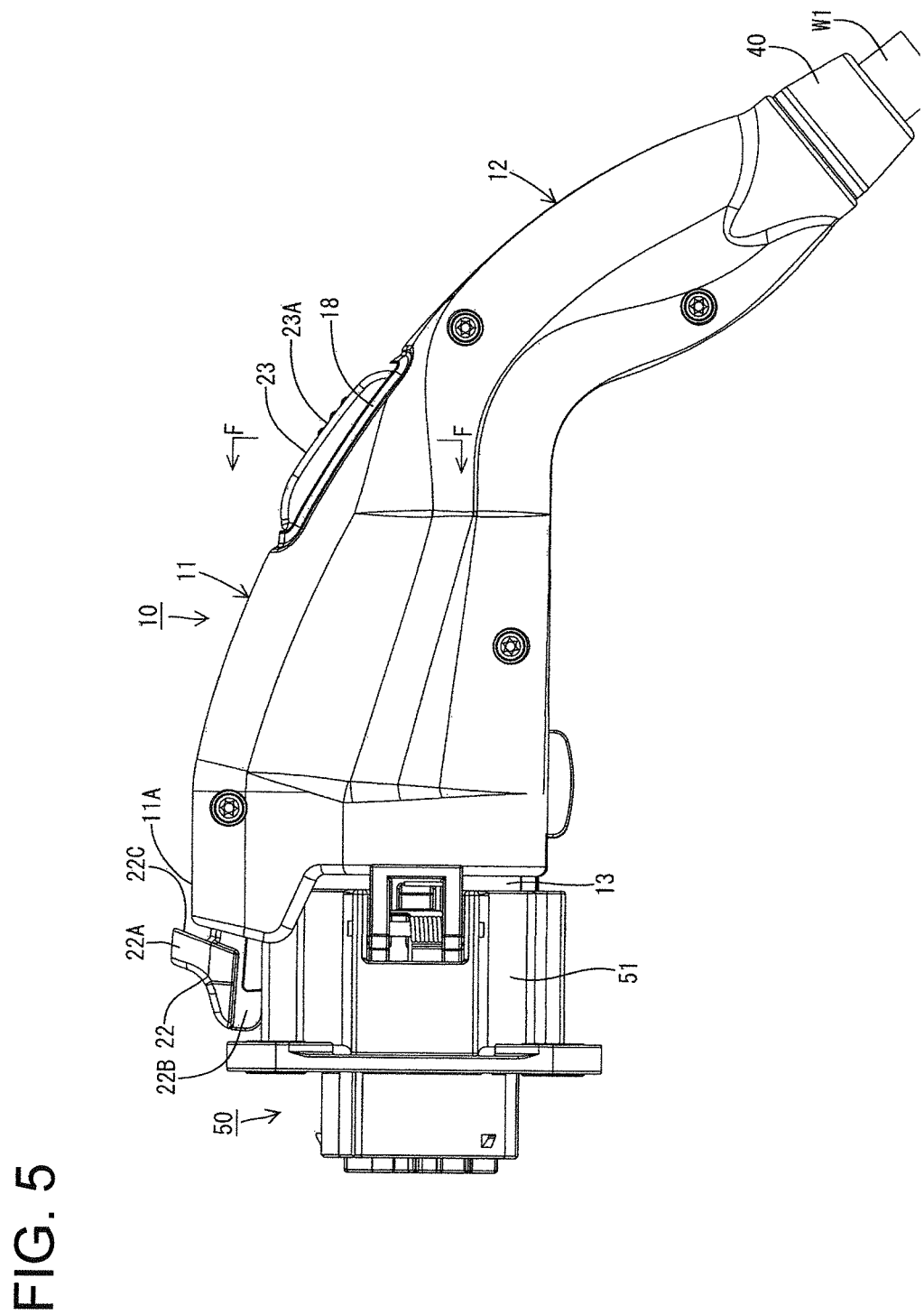
FIG. 5 is a side view of the charging connector showing a state where an unlocking portion is pushed.
Figure 6:
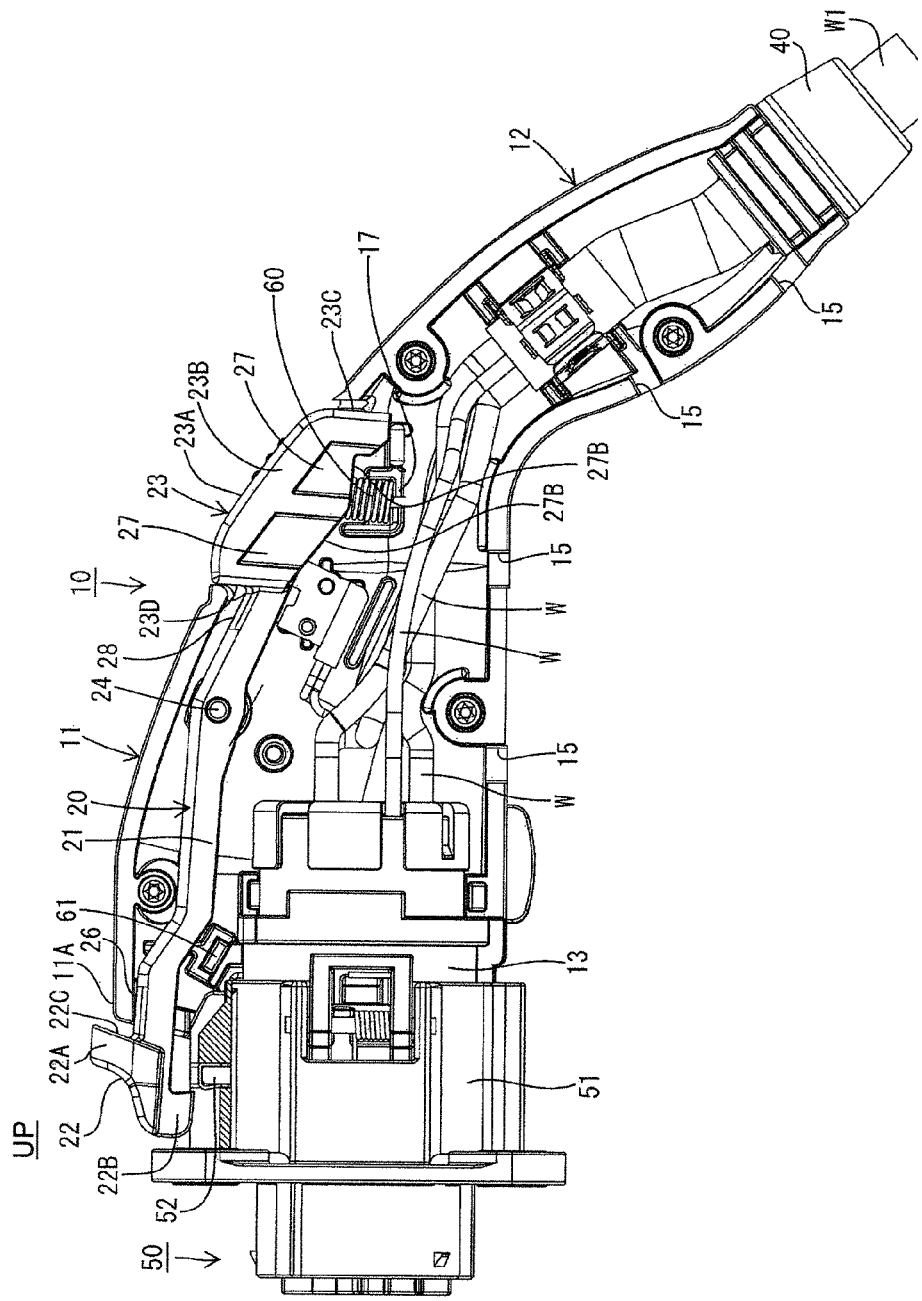
FIG. 6 is a view showing the internal structure of the case body in FIG. 6.

A charging connector in accordance with a particular embodiment of the invention is identified generally by the numeral 10 in FIGS. 1, 2 and 4-8. The charging connector 10 is gun-shaped and includes a main body 11 at a front portion and a grip 12 extending obliquely down from a rear end of the main body 11, as shown in FIG. 1. The main body 11 and the grip 12 are molded unitarily e.g. of synthetic resin. A substantially cylindrical connector fitting portion 13 projects forward at a front end part of the main body 11. The charging connector also includes a lever 20 with a lever shaft 21 accommodated in the main body 11, as shown in FIG. 4.

The connector fitting portion 13 is formed as a separate member from the main body 11 and is fixed to the front end of the main body 11 by an unillustrated locking means. Substantially cylindrical terminal accommodating portions 14 project forward from the back wall of the connector fitting portion 13. Cavities for accommodating terminal fittings (not shown) are formed in the terminal accommodating portions 14.

Wires W extend back from the connector fitting portion 13. The wires W are pulled through the interior of the connector main body 11, into the interior of the grip 12 and are bundled in the grip 12 into one cable W1 covered by an outer sheath. The cable W1 is fixed by a cable grip ring or the like in the grip 12 and further is fixed by a bush 40 at a rear end portion of the grip 12.

The bush 40 is held in close contact with the inner peripheral surface of the rear end opening of the grip 12 and the outer peripheral surface of the cable W1 to prevent water or any other liquid from entering the interior of the grip 12 through the rear end of the grip 12. Water drain holes 15 are formed in the lower surfaces of the main body 11 and the grip 12. Thus, any water or liquid that enters the interior of the main body 11 and the grip 12 can escape to the outside through the water drain holes 15.

Figure 14:
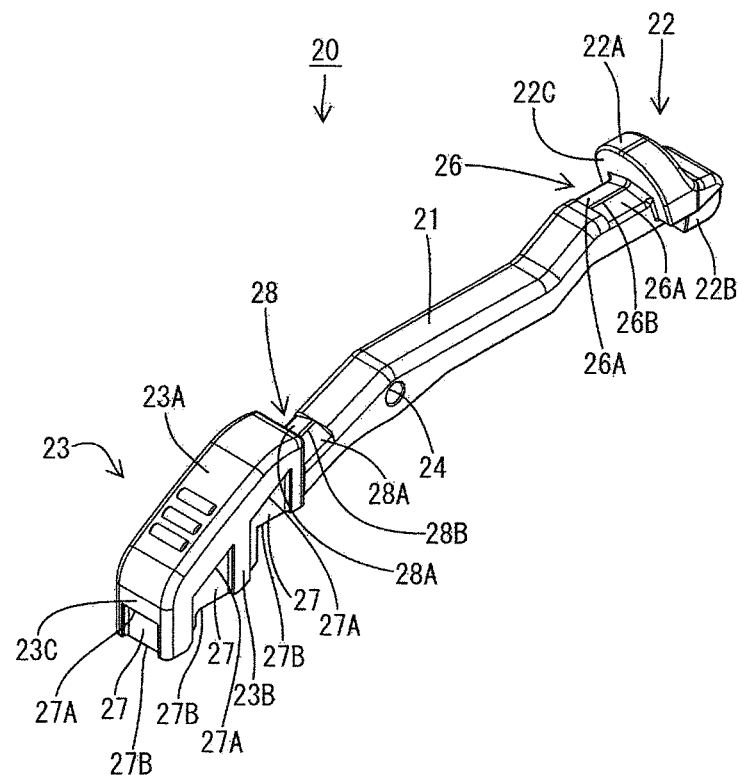
FIG. 14 is a perspective view of a lever according to the embodiment when obliquely viewed from front.
Figure 15:
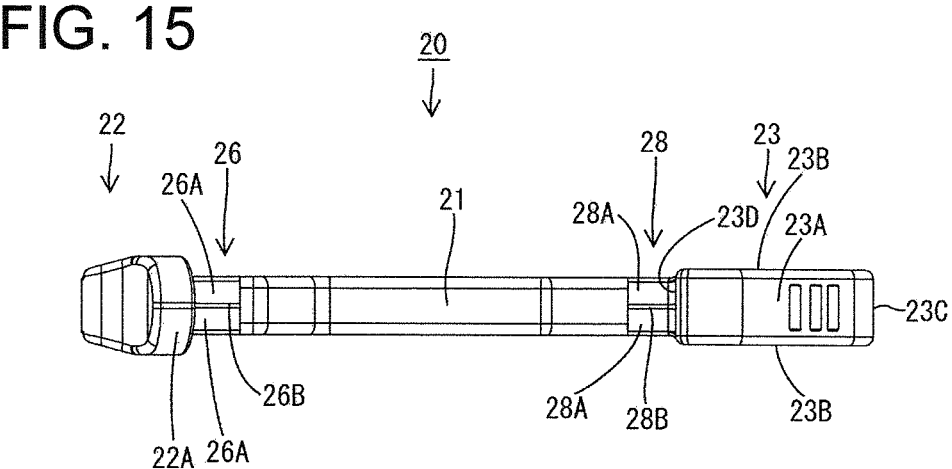
FIG. 15 is a plan view of the lever.

The lever shaft 21 extends in substantially forward and backward directions, as shown in FIG. 14. A lock 22 is provided on a front portion of the lever shaft 21 and an unlocking portion 23 is provided on a rear portion of the lever shaft 21. A lever rotation center 24 is provided in a substantially central part of the lever shaft 21 in forward and backward directions. Thus, the lever shaft 21 can be inclined substantially like a seesaw about this lever rotation center 24 to move both front and rear ends thereof.

Figure 16:
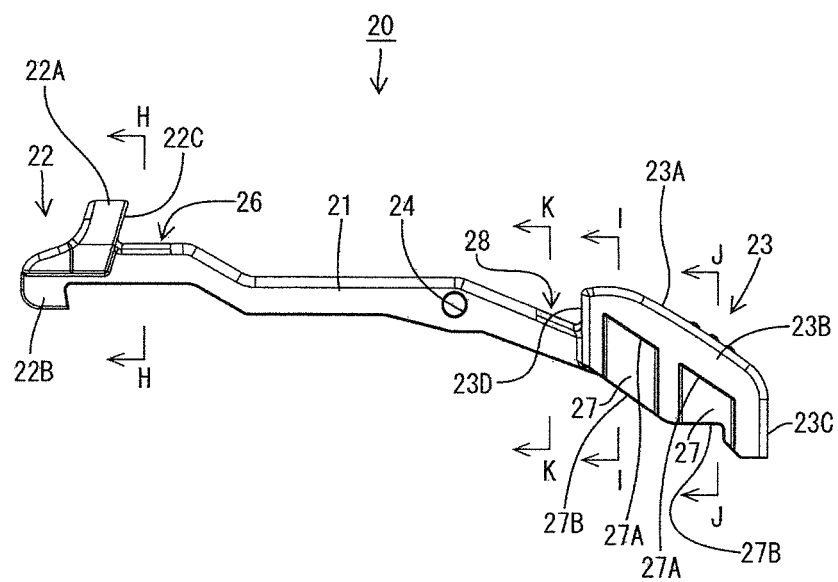
FIG. 16 is a side view of the lever.

As shown in FIG. 16, the lever shaft 21 extends substantially horizontally forward from the lever rotation center 24, then extends obliquely up and then horizontally again, whereas it extends obliquely down toward the back from the lever rotation center portion 24. Thus, the lock 22 is located above the unlocking portion 23.

Figure 7:
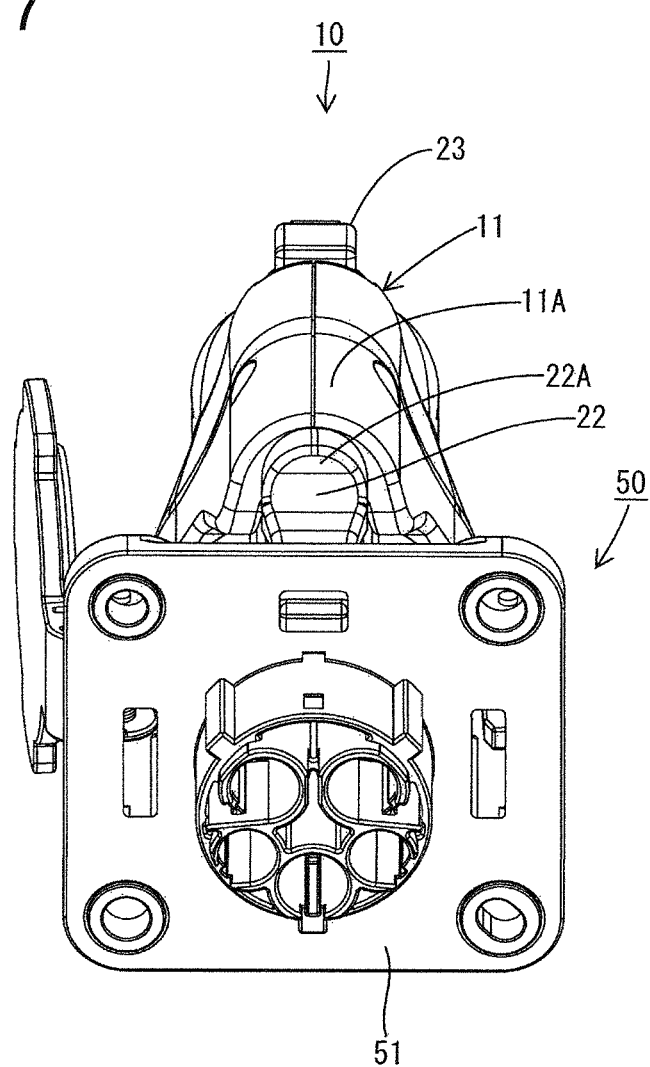
FIG. 7 is a front view of the charging connector showing the connected state to the vehicle-side connector.
Figure 8:
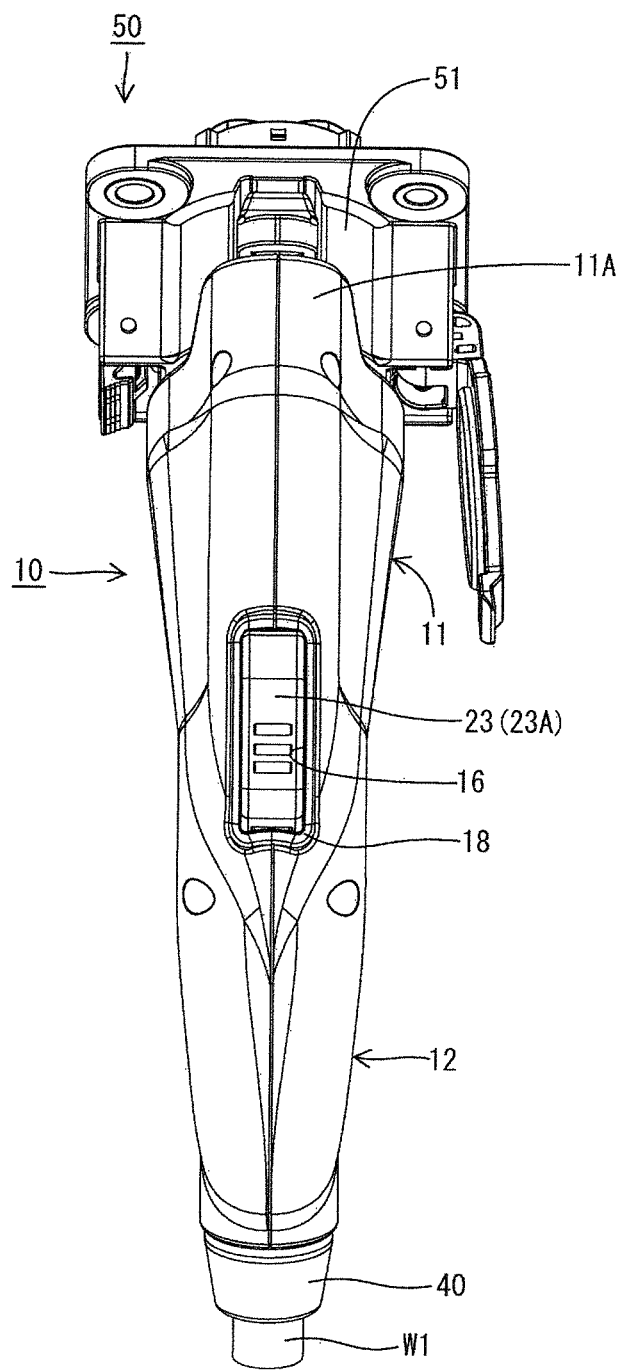
FIG. 8 is a rear view of the charging connector showing the connected state to the vehicle-side connector.
Figure 9:
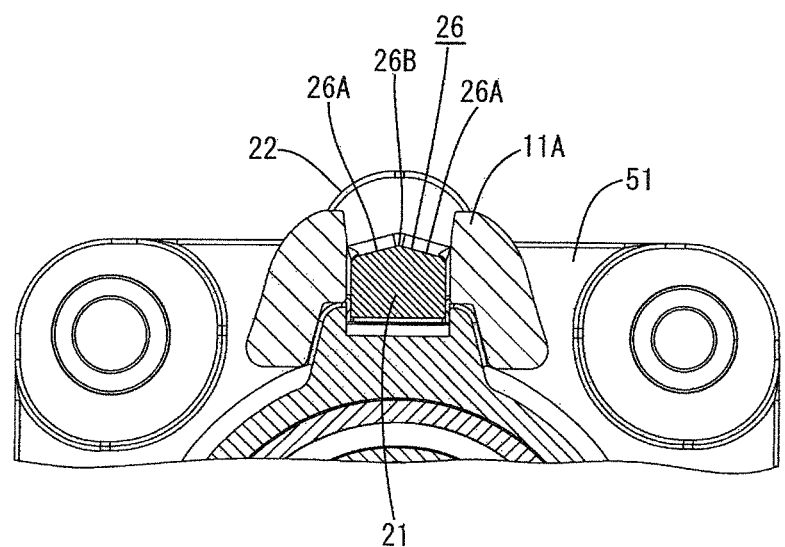
FIG. 9 is a section along B-B of FIG. 2.
Figure 10:
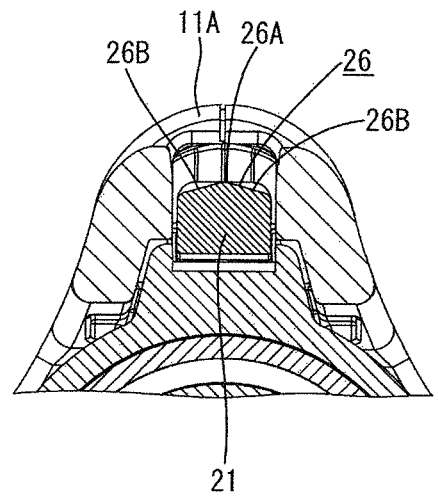
FIG. 10 is a section along C-C of FIG. 2.

As shown in FIGS. 7 and 8, the main body 11 bulges out and up at a position substantially corresponding to the lever 20, and a front end portion of this bulge defines a protection wall 11A that bulges forward. A front end of the lever shaft 21 is covered by the protection wall 11A with only the lock 22 exposed to prevent the lever shaft 21 from being damaged when the charging connector 10 is e.g. dropped by mistake.

The lock 22 includes a head 22A that projects up and out from a horizontal section in the front end of the lever shaft 21 and a latch 22B that projects down and in from this horizontal section. The latch 22B projects more back toward its bottom end, i.e. has an overhanging or undercut shape. Accordingly, a lock projection 52 to be locked to the latch 22B also is formed to have an overhanging shape, as shown in FIG. 4. Thus, a locked state of the latch 22B and the lock projection 52 is not canceled even if the two connectors 10, 50 are pulled in separating directions with the latch 22B and the lock projection 52 locked. A flat metal plate covers the lock projection 52 for reinforcement.

Figure 18:
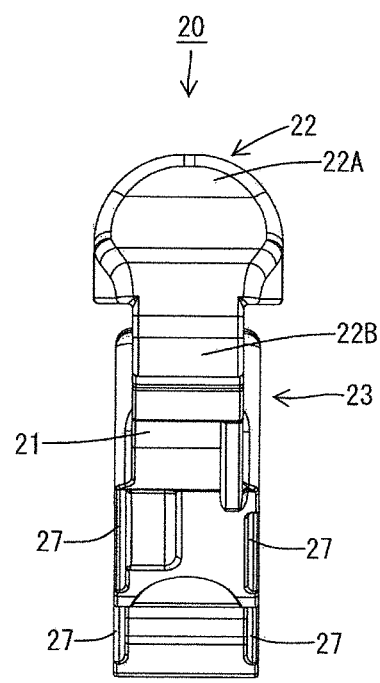
FIG. 18 is a front view of the lever.

The head 22A is wider toward its upper end, as shown in FIG. 18, to ensure sufficient strength to withstand an impact even if the head 22A directly hits the ground.

Figure 2:
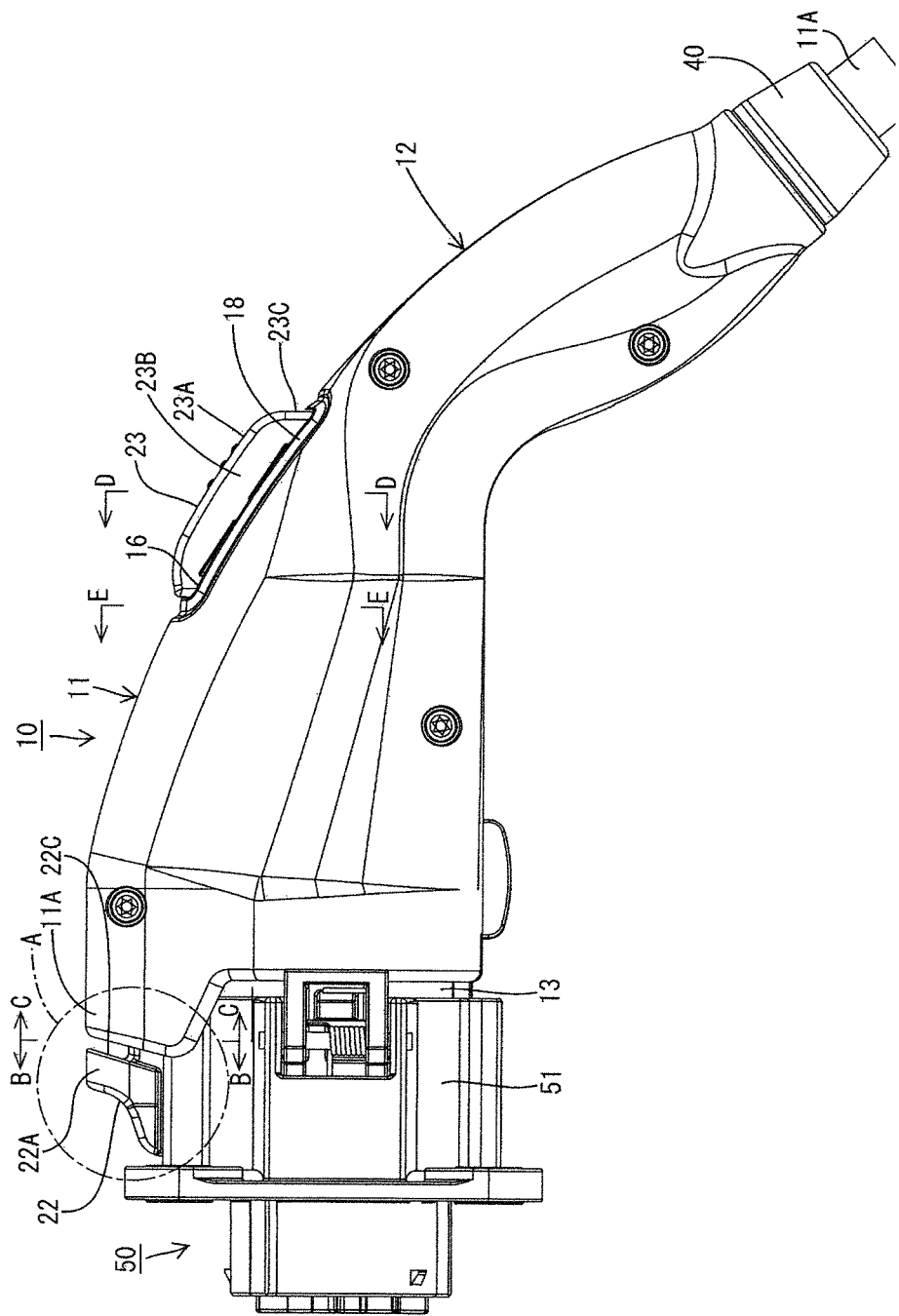
FIG. 2 is a side view of the charging connector showing a connected state to a vehicle-side connector.
Figure 3:
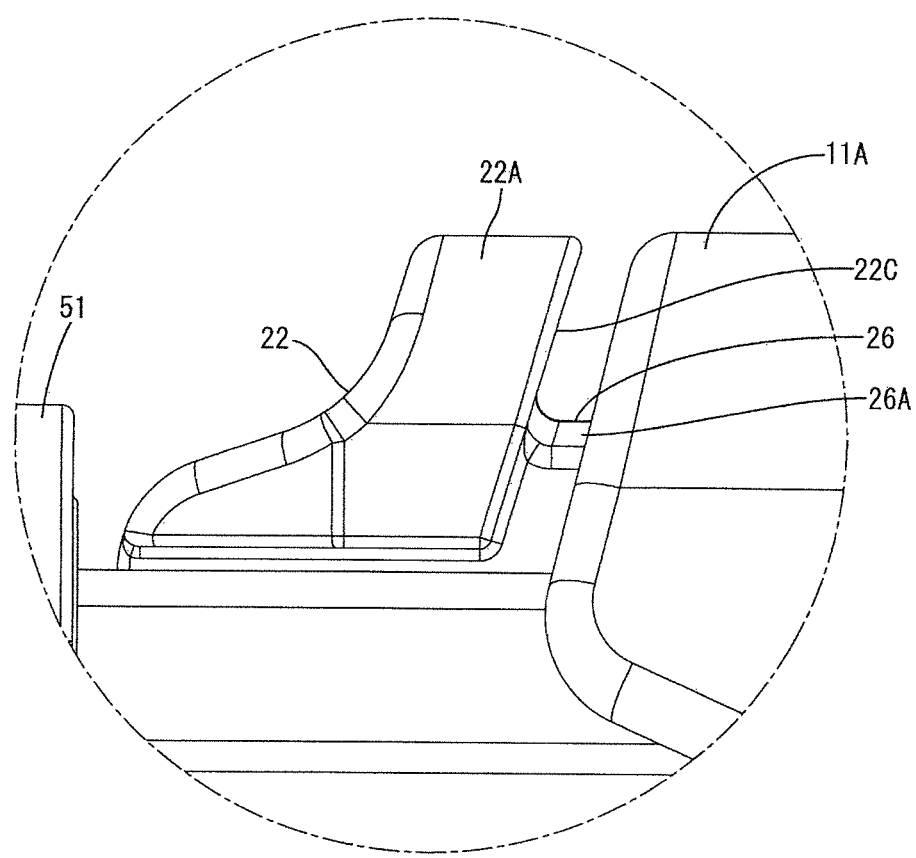
FIG. 3 is a partial enlarged view enlargedly showing a part A in FIG. 2.

A rear surface 22C of the head 22A projects more back toward its upper end to have an overhanging shape, as shown in FIG. 16. The lock 22 is exposed forward from the front end opening at the protection wall 11A of the main body 11, as shown in FIG. 2. Further, with the two connectors 10, 50 connected, an upper part of the front end of the protection wall 11A of the main body 11 is substantially parallel to the rear surface 22C of the head 22A and the upper surface of the main body 11 is substantially flush with the upper surface of the head 22A.

As can be understood from FIGS. 7 and 8, the vehicle-side connector 50 faces somewhat up facing posture in a vehicle and, accordingly, the charging connector 10 to be connected to the vehicle-side connector 50 faces somewhat down. Thus, in its typical use, the rear surface 22C of the head 22A is in a vertical posture and extends substantially vertically when the charging connector 10 is connected to the vehicle-side connector 50. In other words, the rear surface 22C of the head 22A is in such a posture that an upper end thereof is displaced in a direction away from the vehicle-side connector 50 with respect to a plane orthogonal to a connecting direction of the two connectors 10, 50.

Since the rear surface 22C of the head 22A is in the vertical posture to extend substantially in the vertical direction in the connected state, even if snow accumulated on the head 22A melts into water and this water enters between the rear surface 22C of the head 22A and the protection wall 11A, this water does not stay on the rear surface 22C of the head 22A. Therefore a situation where the lock 22 cannot be unlocked due to freezing between the rear surface 22C of the head 22A and the protection wall 11A can be avoided.

Figure 17:
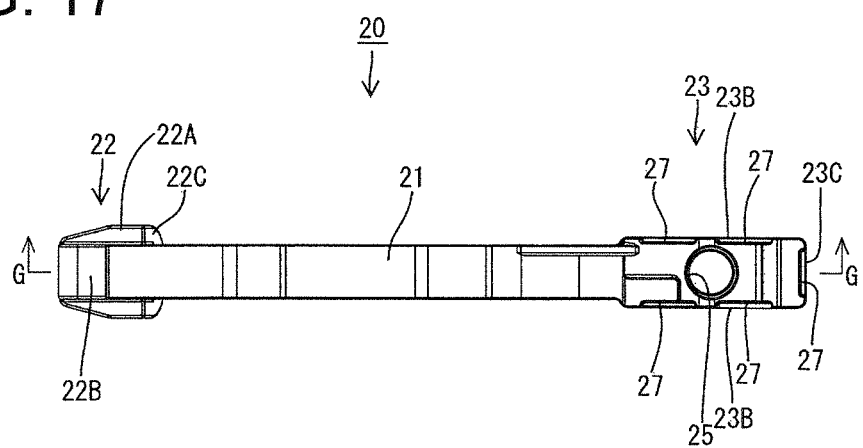
FIG. 17 is a bottom view of the lever.
Figure 19:
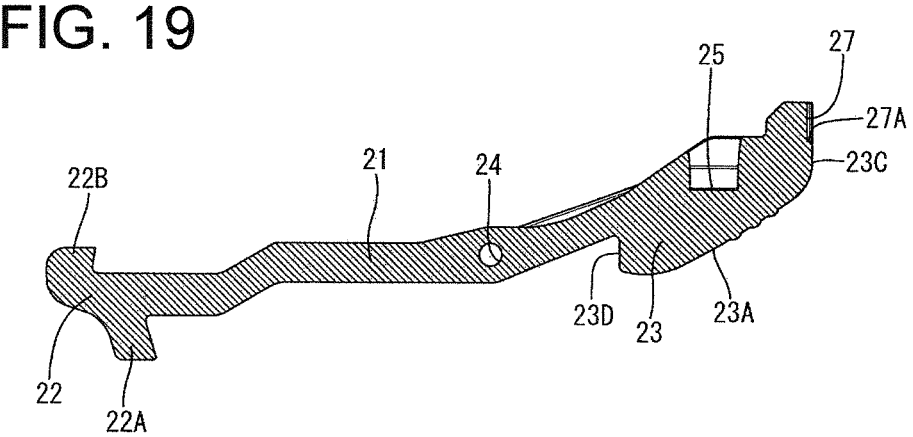
FIG. 19 is a section along G-G of FIG. 17.

The unlocking portion 23 projects up and out at a rear end of the lever shaft 21, as shown in FIG. 16. Additionally, the unlocking portion 23 is exposed and projects up and out from an unlocking hole 16 in a rear part of the upper surface of the main body 11, as shown in FIGS. 1 and 2. The unlocking portion 23 has a pressing surface 23A that extends obliquely down or substantially parallel to the grip 12. Two side surfaces 23B are provided at opposite widthwise sides of the unlocking portion 23 and extend down and in from the opposite widthwise edges of the pressing surface 23A. Further, a rear surface 23C is provided at the rear end of the unlocking portion 23 and extends down and in from the rear edge of the pressing surface 23A. A spring receiving portion 25 is provided in a lower surface of the unlocking portion 23, as shown in FIGS. 17 and 19, for receiving the upper end of a coil spring 60.

As shown in FIG. 4, a spring mounting portion 17 is provided at a position of the connector main body 11 substantially vertically facing the spring receiving portion 25 for supporting the bottom end of the coil spring 60. The coil spring 60 is mounted in a compressed state between the spring receiving portion 25 and the spring mounting portion 17 and biases the rear end of the lever shaft 21 up and out. Thus, the lock 22 is biased constantly toward a locking position LP shown in FIG. 4. On the other hand, the unlocking portion 23 can be pressed down and in, the lock 22 is pushed up and displaced to an unlocking position UP shown in FIG. 6.

As shown in FIG. 4, the lever 20 at the locking position LP is in contact with an impact absorbing pad 61 provided in the main body 11 above the connector fitting 13. Thus, a spring force of the coil spring 60 moves the lock 22 from the unlocking position UP to the locking position LP when the unlocking portion 23 is released, but an impact is absorbed when the lever shaft 21 collides with the impact absorbing pad 61 and a movement of the lock 22 is stopped at the locking position LP.

The charging connector 10 is used outdoors, and rain water may splash on the charging connector 10 or snow may accumulate directly on the charging connector 10 while charging is performed in a cold region. Water deposited on the lock 22 or the unlocking portion 23 may freeze and interfere with an unlocking operation.

For example, water may fall onto the upper surface of the lever shaft 21 through the clearance between the rear surface 22C of the head 22A and the front surface of the protection wall 11A. Ice deposits on the upper surface of the lever shaft 21 are likely to interfere with the inner surface of the protection wall 11A and could disable the ability of the lock 22 to move from the locking position to the unlocking position.

Figure 20:
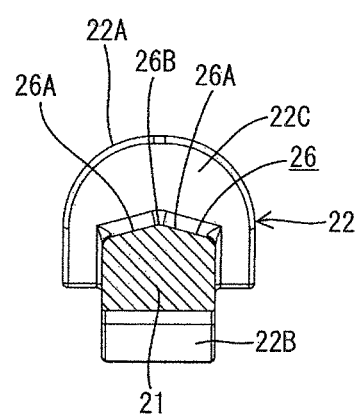
FIG. 20 is a section along H-H of FIG. 16.

Accordingly, a water guide 26 is provided on the upper surface of the lever shaft 21 adjacent the lock 22, as shown in FIGS. 16 and 20, and water that falls to the water guide 26 runs directly down from the lever shaft 21. The water guide 26 has two taper surfaces 26A that slope obliquely down from a tip 26B arranged substantially bilaterally symmetrically in the widthwise center of the water guide 26.

On the other hand, water may enter a clearance between the side surface 23B and the peripheral edge of the unlocking hole 16 and stay between the side surface 23B and the peripheral edge of the unlocking hole 16 due to the action of surface tension. Water that freezes between the side surface 23B and the peripheral edge of the unlocking hole 16 freezes can prevent the unlocking portion 23 from being pushed in. This phenomenon also could occur at the rear surface 23C and a front surface 23D.

As shown in FIGS. 14 and 16, recesses 27 are formed in the side surfaces 23B of the unlocking portion 23 at positions facing the peripheral edge of the unlocking hole 16. Upper edges 27A of the recesses 27 are higher than the peripheral edge of the unlocking hole 16 when the lock 22 is at the locking position. Since distances from the recesses 27 to the peripheral edge of the unlocking hole 16 are longer than those from the side surfaces 23B to the peripheral edge of the unlocking hole 16, the action of surface tension becomes less likely. Thus, water runs more easily down via the recesses 27, thereby eliminating a likelihood that water will freeze in the recesses 27 and interfere with the unlocking operation. Similarly, a recess 27 also is formed in the rear surface 23C.

Two recesses 27 are arranged one after the other in each side surface 23B. The peripheral edges of the recesses 27 are stepped surfaces at an angle and preferably substantially orthogonal to the side surfaces 23B. The front and rear edges of the recesses 27 are substantially parallel and extend substantially vertically. Further, upper edges 27A of the recesses 27 extend obliquely down toward the rear surface 23C and substantially parallel to the pressing surface 23A of the unlocking portion 23. Only one recess 27 is formed in the rear surface 23C, and the peripheral edge of this recess 27 also is stepped at an angle and preferably substantially orthogonal to the rear surface 23C.

Figure 11:
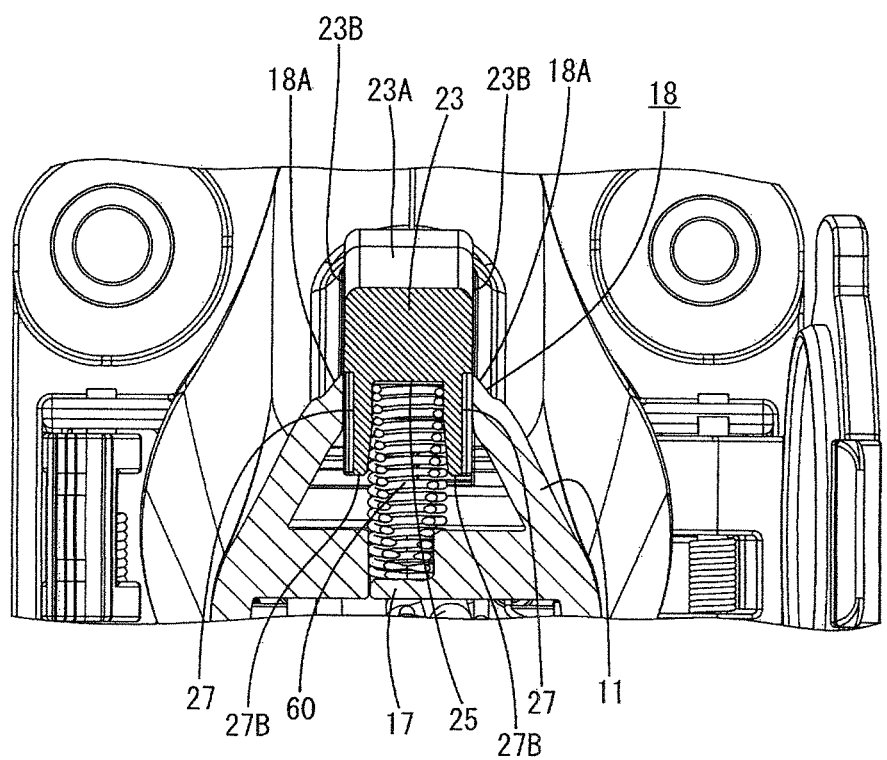
FIG. 11 is a section along D-D of FIG. 2.
Figure 13:
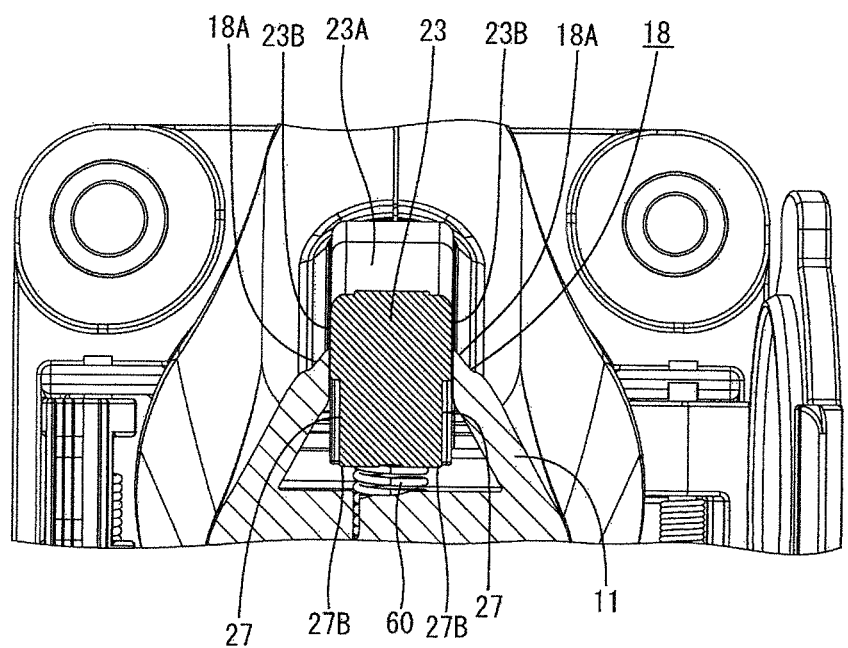
FIG. 13 is a section along F-F of FIG. 2.
Figure 21:
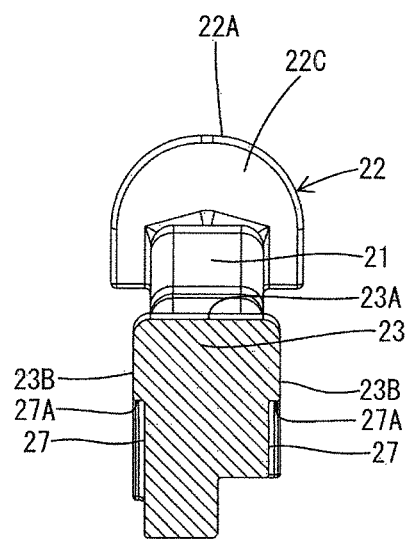
FIG. 21 is a section along I-I of FIG. 16.
Figure 22:
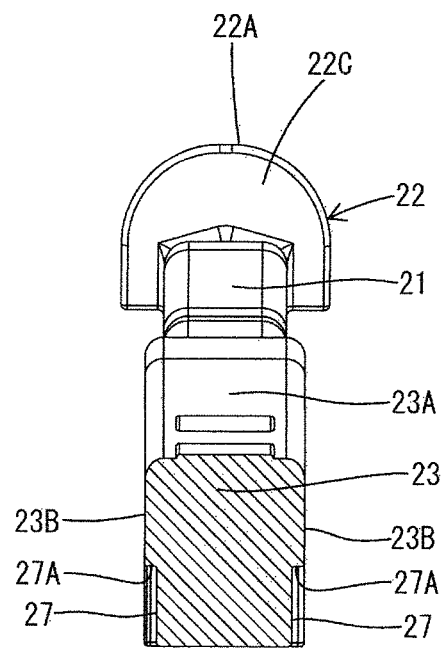
FIG. 22 is a section along J-J of FIG. 16.

Since the upper edges 27A of the recesses 27 are stepped, as shown in FIGS. 19, 21 and 22, any small amount of ice that may be formed between the recesses 27 and the peripheral edge of the unlocking hole 16 can be crushed by a shear force. In other words, the upper edges 27A of the recesses 27 enter the unlocking hole 16, as shown in FIGS. 11 and 13 if the unlocking portion 23 is pushed in. Thus, the upper edges 27A of the recesses 27 and the peripheral edge of the unlocking hole 16 act as shear blades. Therefore, even if ice is formed in the recesses 27, it can be crushed easily by the upper edges 27A of the recesses 27.

No recess 27 is formed in the front surface 23D of the unlocking portion 23. This is because the lever shaft 21 and the front surface portion 23D of the unlocking portion 23 are arranged to form an undercut as shown in FIG. 16 and a slide mold is necessary to form the recess 27 in the front surface portion 23D of the unlocking portion 23, which complicates a mold structure and increases mold cost. Accordingly, water having entered between the front surface 23D of the unlocking portion 23 and the peripheral edge of the unlocking hole 16 needs to be dropped directly onto the upper surface of the lever shaft 21. To this end, a distance between the front surface 23D of the unlocking portion 23 and the peripheral edge of the unlocking hole 16 is set so that the action of surface tension is unlikely.

Figure 23:
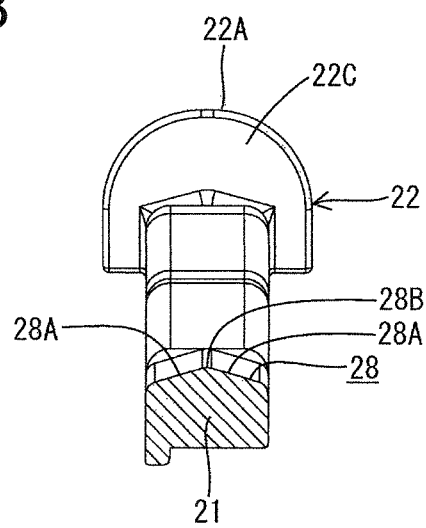
FIG. 23 is a section along K-K of FIG. 16.

However, if water having fallen onto the upper surface of the lever shaft 21 freezes in this state, ice formed on the upper surface of the lever shaft 21 interferes with the inner wall of the connector main body 11, thereby interfering with the unlocking portion. Accordingly, at least one water drain 28 is provided around the unlocking portion 23 on the upper surface of the lever shaft 21. This water drain 28 is constructed similarly to the water guide 26 and includes two taper surfaces 28A. As shown in FIG. 23, the taper surfaces 28A are sloped obliquely down from a tip 28B and are arranged substantially bilaterally symmetrically in the widthwise center of the water drain 28. By this, water having fallen down onto the water drain 28 can be drained down from the lever shaft 21.

Figure 12:
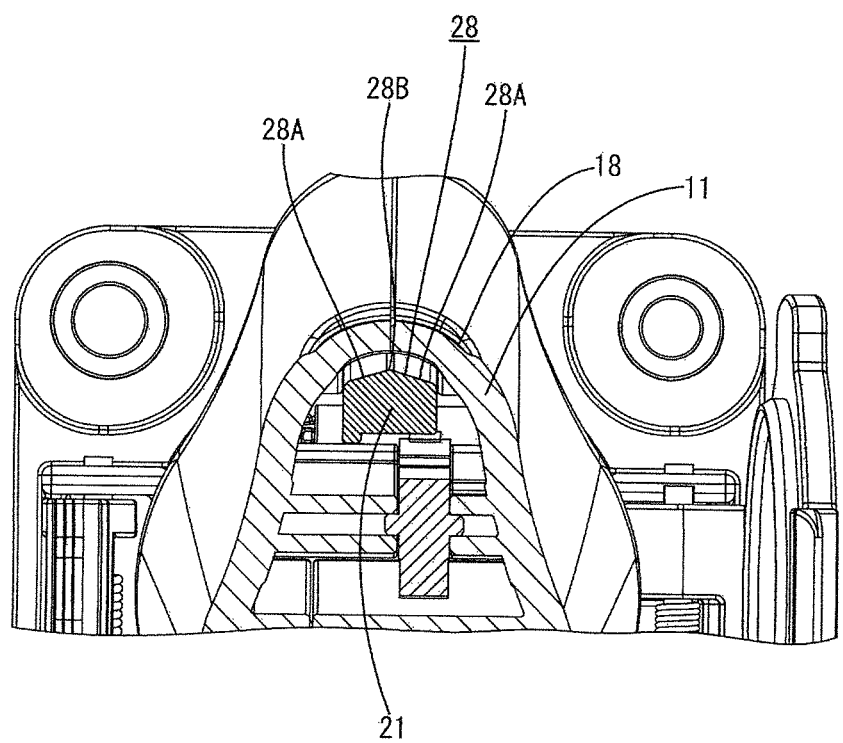
FIG. 12 is a section along E-E of FIG. 2.

In addition to these, a guide 18 is provided at a peripheral edge of the unlocking hole 16 and is connected to the side surfaces 23B of the unlocking portion 23 via an inclined surface 18A as shown in FIGS. 11, 12 and 13. The inclined surface 18A in this embodiment has a steep angle of inclination. The guide 18 is provided at the peripheral edge of the unlocking hole 16 over substantially the entire circumference. Water that deposits on the side surface 23B of the unlocking portion 23 is guided more easily to the guide 18 by the inclined surface 18A. Thus, entrance of water between the unlocking portion 23 and the peripheral edge of the unlocking hole 16 can be reduced maximally.

The lock 22 moves onto the lock projection 52 when the two connectors 10, 50 are being connected and inclines the lever 20. A connected state is reached when the two connectors 10, 50 are connected further, as shown in FIG. 4. Simultaneously, the lock 22 moves over the lock projection 52, the lever 20 is restored resiliently and the lock 22 and the lock projection 52 are locked to each other in the connecting direction. In this way, the two connectors 10, 50 are locked in the connected state. A battery is charged with the two connectors 10, 50 connected. When charging is completed, the grip 12 is held by hand and the pressing surface 23A of the unlocking portion 23 is pressed with a thumb.

Water that enters main body 11 from the lock 22 will fall onto the water guide 26 and is caused to run down from the lever shaft 21 by the taper surfaces 26A. Water that deposits on the unlocking portion 23 is guided toward the guide 18 by the inclined surface 18A of the guide 18 and runs down along the outer peripheral surface of the main body 11. Thus, water entrance into the main body 11 through the unlocking hole 16 is prevented.

Water deposited on the unlocking portion 23 may enter the recess 27. In this case, the water particularly runs down along a lower edge 27B of the recess 27, into the main body 11 and is drained to the outside of the main body 11 through the water drain holes 15. Even if ice should form in the recesses 27, it is sheared and crushed between the upper edges 27A of the recesses 27 and the peripheral edge of the unlocking hole 16 by pressing in the unlocking portion 23.

Further, water having entered the connector main body 11 through a clearance between the front surface 23D of the unlocking portion 23 and the peripheral edge of the unlocking hole 16 falls onto the water drain 28 and runs down from the lever shaft 21 by the taper surfaces 28A. Therefore, the unlocking portion 23 will not be frozen at the peripheral edge of the unlocking hole 16 and the unlocking operation can be performed.

As described above, the water guide 26 on the upper surface of the lever shaft 21 near the lock 22 substantially eliminates the chance that ice will form on the upper surface of the lever shaft 21 and interfere with the inner surface of the protection wall 11A. Further, the taper surfaces 26A of the water guide 26 enable water to run down from the lever shaft 21. Therefore, there will be no interference with the unlocking operation caused by freezing of the lock 22.

Further, the recesses 27 on the side surfaces 23B and the rear surface 23C of the unlocking portion 23 enable water to run down more easily. Hence, water is unlikely to stay between the unlocking portion 23 and the peripheral edge of the unlocking hole 16. Further, water deposited on the unlocking portion 23 is guided to the guiding portion 18 via the inclined surface 18A and is less likely to enter between the unlocking portion 23 and the peripheral edge of the unlocking hole 16. Furthermore the taper surfaces 28A of the water drain 28 ensure that any water that enters between the front surface 23D of the unlocking portion 23 and the peripheral edge of the unlocking hole 16 will run down. Therefore, interference with the unlocking operation caused by freezing of the locking portion 22 can be avoided.

The invention is not limited to the above described and illustrated embodiment. For example, the following embodiments also are included in the scope of the invention.

Although the water guide 26 is formed by the taper surfaces 26A in the above embodiment, it may be formed by an arcuate or bent surface according to the invention.

Although the water guide 26 is formed by two taper surfaces 26A in the above embodiment, it may be formed by one taper surface or three or more taper surfaces.

The recesses 27 are formed in both the side surfaces 23B and the rear surface 23C of the unlocking portion 23 in the above embodiment. However, the recesses 27 may be formed in either the side surfaces 23B or the rear surface 23C according to the invention. Further, two recesses 27 are formed in each side surface 23B in the above embodiment to divide this side surface 23B into two areas. However, one recess may be formed substantially in the entire area of the side surface 23B or three recesses may be formed to divide the side surface 23B into three areas according to the invention. In this case, it is preferable to maximally narrow partition walls defining the respective recesses.

The guide 18 is provided at the peripheral edge of the unlocking hole 16 substantially over the entire circumference in the above embodiment. However, guides may be provided only at parts of the peripheral edge of the unlocking hole 16 not facing the recesses 27 according to the invention.

The guide 18 is formed by the inclined surface in the above embodiment, but it may be formed by applying a surface processing with high water wettability according to the invention.

No recess is formed in the front surface portion 23D of the unlocking portion 23 in the above embodiment. However, a recess may be formed in the front surface portion 23D according to the invention if the front surface portion 23D does not form an undercut part and the recess can be formed without using a slide mold. In this case, the water drain 28 may be omitted.

What is claimed is:

1. A charging connector to be connected to a vehicle-side connector connected to a battery in a vehicle for charging the battery, comprising:
   a case body including a connector fitting connectable to the vehicle-side connector;
   a lock for holding the vehicle-side connector and the charging connector in a connected state by locking to a lock-receiving portion on the vehicle-side connector;
   a lever shaft in the case body, a water guide provided on a surface of the lever shaft in proximity to the lock;
   an unlocking portion projecting from an upper surface of the lever shaft for deleting a locked state of the lock and the lock-receiving portion, a downwardly sloped water drain being provided on the upper surface of the lever shaft in proximity to the unlocking portion; and
   an unlocking hole formed in the case body at a position corresponding to the unlocking portion,
   wherein the unlocking portion at least partly projects outside of the case body through the unlocking hole and includes at least one recess at a position substantially facing a peripheral edge of the unlocking hole.

2. The charging connector of claim 1, wherein at least one inclined guide is provided at a peripheral edge of the unlocking hole opposed to a side surface of the unlocking portion.

3. The charging connector of claim 1, wherein the water guide comprises one or more taper surfaces sloped down obliquely down from a tip of the water guide.

4. The charging connector of claim 1, wherein a distal edge of the recess defines at least one step.

5. The charging connector of claim 1, wherein the unlocking portion includes:
   a pressing surface extending obliquely down and substantially parallel to a part of the case body;
   two side surfaces extending down and in from the pressing surface at substantially opposite widthwise sides of the unlocking portion; and
   a rear surface extending down and in at a rear end of the unlocking portion.

6. The charging connector of claim 1, wherein a distance between a front surface of the unlocking portion and a peripheral edge of the unlocking hole (16) is set to substantially prevent action of surface tension.

7. The charging connector of claim 1, wherein a distal edge of the recess and the peripheral edge of the unlocking hole are configured to crush any ice formed in the recess.

8. The charging connector of claim 1, wherein one or more water drain holes are formed in at least one lower surface of the case body.

* * * * *